No. 723,882. PATENTED MAR. 31, 1903.
J. O. E. KROHN.
NUT LOCK.
APPLICATION FILED MAR. 31, 1902.
NO MODEL.
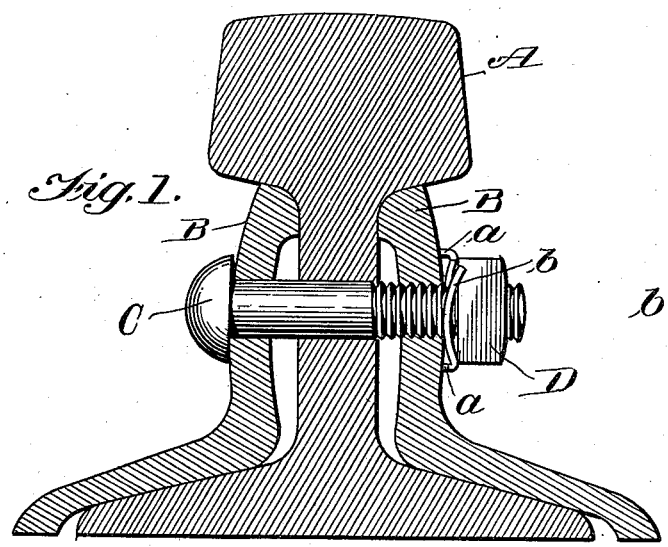
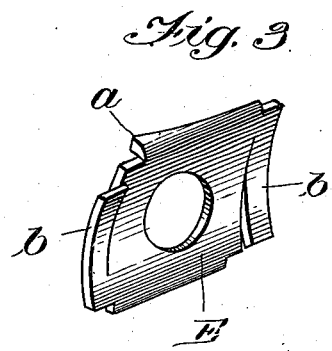
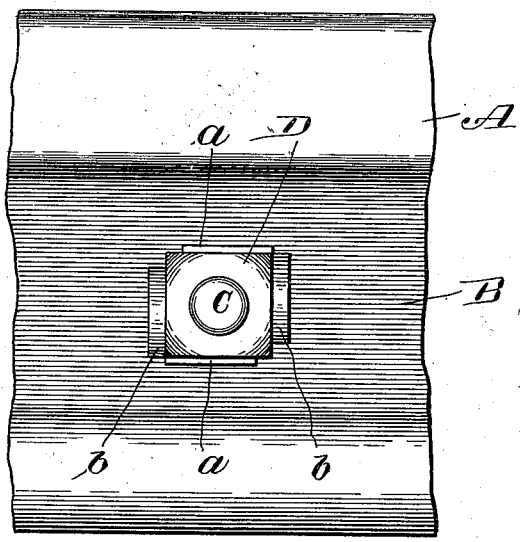
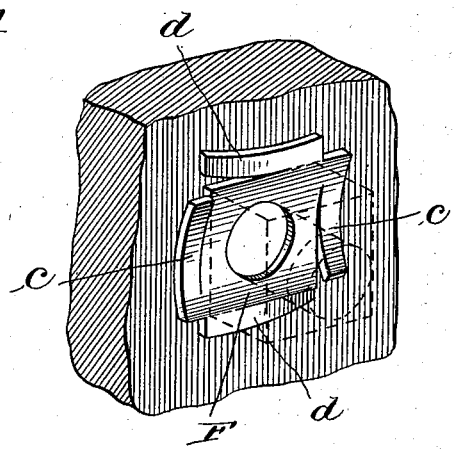
Witnesses:
H. S. Gaither
M. Friel
Inventor:
John O. E. Krohn.
by Frank D. Thomason
Attorney

UNITED STATES PATENT OFFICE.

JOHN O. E. KROHN, OF HARVEY, ILLINOIS.

NUT-LOCK.

SPECIFICATION forming part of Letters Patent No. 723,882, dated March 31, 1903.

Application filed March 31, 1902. Serial No. 100,815. (No model.)

*To all whom it may concern:*

Be it known that I, JOHN O. E. KROHN, a citizen of the United States, and a resident of Harvey, in the county of Cook and State of Illinois, have invented certain new and useful Improvements in Nut-Locks, of which the following is a full, clear, and exact specification.

The object of my invention is to provide a simple, cheap, and effective nut-lock, which can be applied to bolts and nuts used in connection with metal or wood. This I accomplish by the means hereinafter fully described, and as particularly pointed out in the claims.

In the drawings, Figure 1 is a sectional view of a track-rail and fish-plates therefor connected by a bolt and nut having my improved nut-lock applied thereto. Fig. 2 is a side view of the same. Fig. 3 is a perspective view of said nut-lock. Fig. 4 is a perspective view of a modified form of said nut-lock, illustrating the manner of its application to wood.

In the drawings, A represents a track-rail; B B, the fish-plates used in connection therewith; C, the bolt, and D the nut for assembling and holding said parts together.

The nut-lock comprises a concavo-convex plate E of sheet metal of rectangular proportions, which has a suitable bolt-hole in its center and is slightly longer than it is wide. This plate has a portion of one or both of its longitudinal side edges bent in the direction of its convex side substantially at right angles to its outer concave face and beveled like a saw-tooth to provide spurs $a\, a$. Should an attempt to reverse the nut after it is locked be made, it will cause spurs $a$ to dig or bite the metal and prevent a corresponding reverse movement of the nut-lock. Near each end and between the same and the contiguous point of the spur $a$ plate E is provided with transverse slits, the entrance of which is from the same side of the plate as the adjacent point of the spur. These slits extend nearly to the opposite longitudinal side of said plate and form tongues $b\, b$, which are bent outward sufficiently, so that when the nut is turned from left to right to "tighten" the work it rides over them, but when turned in the reverse direction so as to "loosen" it it comes in contact with the inner longitudinal edges of tongues $b\, b$ and is prevented from further reverse movement.

In operation after the bolt is inserted through the work a nut-lock is slipped over the screw-threaded end portion extending beyond the same with the concave side outermost. The nut is then screwed onto the bolt until it engages and compresses said concavo-convex nut-lock. Any attempt to reverse the nut is resisted by tongues $b$, and any movement in the reverse direction of the nut-lock causes the spur $a$ to bite into the material of the part next which it is placed. In this connection it will be noticed that the greater the pressure of the nut on the nut-lock the farther into the metal of the fish-plate or other metal element will the spurs bite and the farther will the tongues stand out from the body of the said lock. This result is due to the curvature of the plate from which the nut-lock is made, and another beneficial result of this curvature is the fact that the pressure of the nut thereon is not borne wholly by the spurs, but is borne by the center of the said plate as well as by the spurs, and thus prevents the latter from breaking off. If it should be desired to unlock the nut, a blow with a chisel and hammer on the tongue will break them off, thus removing the opposition to the loosening of the nut, which can then be taken off the bolt, if desired.

In Fig. 4 of the drawings is shown a modified construction of my invention, which is more particularly designed for use when the bolt and nut are used to secure wooden parts together. This modification consists of a flat rectangular plate F, (which, however, can be concavo-convex, if desired,) having tongues $c\, c$ and $d\, d$, similar to tongues $b$, formed on and parallel to each side thereof, except that two of these oppositely-located tongues $c\, c$ are bent in one direction and the other two $d\, d$ in the opposite direction. A nut-lock thus constructed is reversible, and in operation the two outwardly-bent tongues will oppose the loosening of the nut and the two inwardly-bent tongues will bite into the wood.

I do not desire to be confined to any particular shape of nut-lock nor to the number of spurs or tongues or their respective equivalents which it possesses, because it is obvious these can be changed without departing from the spirit of my invention.

What I claim as new is—

1. A nut-lock comprising a concavo-convex plate having inwardly-projecting spurs on opposite sides thereof, and outwardly-bent tongues located between and arranged at right angles to said spurs.

2. A nut-lock comprising a concavo-convex plate having an inwardly-projecting spur, and an outwardly-bent tongue extending transversely to the curvature of said plate.

3. A nut-lock comprising a concavo-convex plate of rectangular proportions having means for biting into the surface against which it is depressed, and provided with outwardly-bent tongues made by providing said plate with transverse slits extending from one longitudinal side to near the other one located near and parallel to the ends thereof.

4. A nut-lock comprising a concavo-convex plate having inwardly-projecting spurs on opposite sides thereof, and outwardly-bent tongues, extending transversely to the curvature of said plate, located and arranged at right angles to said spurs.

5. A nut-lock comprising a concavo-convex plate of rectangular proportions having outwardly-bent tongues made by providing said plate with slits extending from one longitudinal side to near the other across the curvature of the plate, and near and parallel to the ends thereof, and provided with inwardly-projecting spurs on the longitudinal sides of said plate at right angles to said tongues the points of which are adjacent to the free ends of said tongues.

6. A nut-lock comprising a concavo-convex plate having tongues bent out of the plane of the body of the same, and made by providing said plate with slits parallel to the edges thereof and extending from the side of the plate at right angles thereto, to near the opposite side.

JOHN O. E. KROHN.

Witnesses:
M. FRIEL,
FRANK D. THOMASON.